(12) United States Patent
Will

(10) Patent No.: US 7,296,904 B2
(45) Date of Patent: Nov. 20, 2007

(54) REFLECTOR FOR LASER INTERROGATION OF THREE-DIMENSIONAL OBJECTS

(75) Inventor: Peter Will, Los Altos Hills, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 09/681,622

(22) Filed: May 10, 2001

(65) Prior Publication Data

US 2001/0043412 A1  Nov. 22, 2001

Related U.S. Application Data

(60) Provisional application No. 60/203,724, filed on May 12, 2000.

(51) Int. Cl.
*G02B 5/08* (2006.01)
(52) U.S. Cl. .............. 359/857; 359/861; 359/862; 359/865; 359/900; 359/846
(58) Field of Classification Search ........... 359/850, 359/851, 855, 856, 857, 858, 861, 862, 863, 359/865, 846, 900; 385/18
See application file for complete search history.

(56) References Cited

U.S. PATENT DOCUMENTS

| 4,815,827 | A  | * | 3/1989  | Lane          |
| 5,256,869 | A  |   | 10/1993 | Lin et al.    |
| 5,457,493 | A  |   | 10/1995 | Leddy et al.  |
| 5,808,780 | A  | * | 9/1998  | McDonald      |
| 5,960,132 | A  | * | 9/1999  | Lin           |
| 6,097,859 | A  | * | 8/2000  | Solgaard et al. |
| 6,212,309 | B1 | * | 4/2001  | Nguyen et al. |
| 6,292,300 | B1 | * | 9/2001  | Lee et al.    |
| 6,317,530 | B1 | * | 11/2001 | Ford          |
| 6,330,102 | B1 | * | 12/2001 | Daneman et al. |
| 6,396,976 | B1 | * | 5/2002  | Little et al. |
| 6,411,751 | B1 | * | 6/2002  | Giles et al.  |
| 6,430,330 | B1 | * | 8/2002  | Hagelin       |
| 6,466,711 | B1 | * | 10/2002 | Laor et al.   |
| 6,490,382 | B1 | * | 12/2002 | Hill          |

* cited by examiner

*Primary Examiner*—Ricky D. Shafer
(74) *Attorney, Agent, or Firm*—Fish & Richardson P.C.

(57) ABSTRACT

A digital control for light beams. A position of an output light beam is changed based on a digital input control formed of a plurality of bits. The device may use movable mirrors to change the position of the output light beams.

35 Claims, 3 Drawing Sheets

REFLECTOR FOR LASER INTERROGATION OF THREE-DIMENSIONAL OBJECTS

CROSS REFERENCE TO RELATED APPLICATIONS

This application claims priority from Provisional Application No. 60/203,724, filed May 12,2000.

BACKGROUND OF INVENTION

Laser based scanners have long been used for detecting information about objects. One common use of such laser scanners is for detecting three-dimensional information about an object being imaged. The capability of deflecting laser or light beams is of great economic importance in the fields of optical switching, all-optical networking or photonic switching. Deflecting light beams is often performed by a servo-driven galvanometer or mirror scanner. Scanning can also be carried out by using crossed acoustic waves in a surface acoustic wave device.

Mirror-based devices are often designed for high frequency response. This may necessitate a light weight design. This in turn may compromise the structural integrity of the device.

Surface acoustic wave devices are often of poor directional and attenuation properties.

Movable mirrors may also be positioned by analog or by digital techniques. The Texas Instruments digital mirror, and the new Bell Labs analog mirror deflector (http://www.lucent.com/livelink/127844_Brochure.pdf) are MEMS devices using movable mirrors. TI is a digitally controlled device, and Lucent uses analog control. Analog control is difficult to achieve in the Lucent switch with desired accuracy because of the nonlinearities of the cantilever system used The electrostatic actuation in a cantilever is nonlinear in force. The force between capacitor plates and this nonlinearity may render the control complex.

SUMMARY OF INVENTION

The present invention teaches an apparatus using binary based digital control of optical beam position.

This apparatus may be inserted into a conventional light path in order to deflect a light beam both digitally and programmably. An embodiment may use mirrors based on MEMS technology. Another embodiment may use ordinary mirrors. Applications include optical switching in communications as well as scanning.

BRIEF DESCRIPTION OF DRAWINGS

These and other, aspects will now be described in detail, with reference to the accompanying drawings, in which.

DETAILED DESCRIPTION

The present system describes a digitally actuated light deflector, operating to change the position of an output optical beam based on a binary digital control. This device may be used for many different purposes, including switching beams between optical fibers in communication networks, in which case the beams may be modulated by conventional means. This may also be used for optical scanning.

Figure 1:
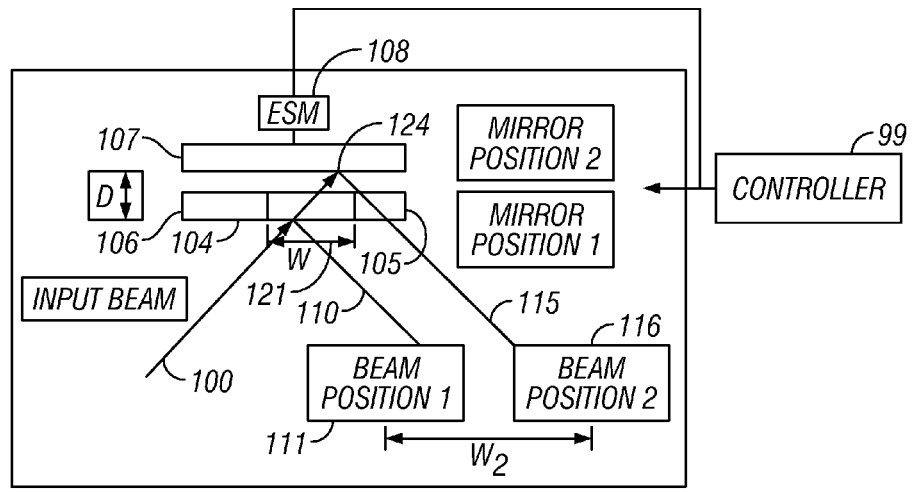
FIG. 1 shows how movable mirrors may be used to deflect a beam position.

FIG. 1. shows an embodiment that illustrates the basic concept. In FIG. 1, a beam is deflected to one of two different positions based on a digital control from controller 99.

Input beam 100 is input along a specified path to a mirror 105. The mirror 105 is movable between first position 106, and second position 107. An electrostatic attraction module (ESM) can selectively control the position of the mirror. When actuated, the mirror is drawn towards the electrostatic actuation module, and hence moves to the second position 108.

In alternative embodiment, electromagnetic actuator can be used in place of an electrostatic actuator.

The input beam 100 is reflected from the reflective first surface 104 of the mirror 105. When the mirror 105 is at the position 106, the beam is reflected along beam path 110, ending up at beam position 1 shown as 111. When the mirror is moved to position 107, the reflected output beam is translated along a different path 115 to beam position 2, shown as 116. In this embodiment, the mirror positions are binary, i.e. the mirror is either in one position or the other, but not between the two positions. Therefore, the position of the beam is deflected in binary steps between the positions 111 and 116.

Note that the beam can intersect the reflective surface 104 of the mirror at either of two locations: either at first location 121 or second location 124. Therefore, the mirror needs to be wide enough to accommodate the beam reflecting from either of these two locations 121 or 124, called the beam "pencil". The minimum width of the mirror is shown as "w" in FIG. 1.

Positions 106 and 107 are separated by a distance d.

The deflection can be described in terms of an equation: $d = a/2 \tan \theta$ where d is the distance between positions, a is the beam width of the input beam and $\theta$ is the input angle.

Analogously, the width of the mirror, W, can be found according to a proportion to cosine of $\theta$.

This simple example shows how a digital control to the ESM 108 can be used control the output position of the input beam to between two different locations. Another deflector can be placed at a location to deflect the beams 111, 116. The distance w2 between the beams 111, 116 is called the pencil width. This second mirror which would deflect the beams 111, 116 would need to be wide enough to accommodate the distance w2. Note that this width is twice as wide as the first width w1. This series can continue, with each reflector that is added to the series doubling the dimensions of the reflector before it.

Two different movable mirrors would provide 4 different possible output beam positions. More generally, n different movable mirrors will provide $2^n$ different beam output positions. Hence an n bit digital deflection mirror array, having $2^n$ positions, can be built using n of such cells. A movable mirror must be placed for each bit of the digital word.

Each beam is deflected from each mirror. The size of the pencil is doubled for each bit, hence forming a wider spread of beams, and a wider necessary mirror. Therefore, the size of each mirror cell is a power of two larger than the previous mirror cell in the chain. The displacement d may also be a power of two larger in the second set of mirror cells.

Since the dimensions of the mirrors are increased, this correspondingly implies that the masses of the mirrors must also increase. This may be undesirable, since mirrors which have larger masses may be moved slower for a given amount of moving force, and hence either give lower the frequency response of the system or require more force to move them at the same speed.

Figure 2:
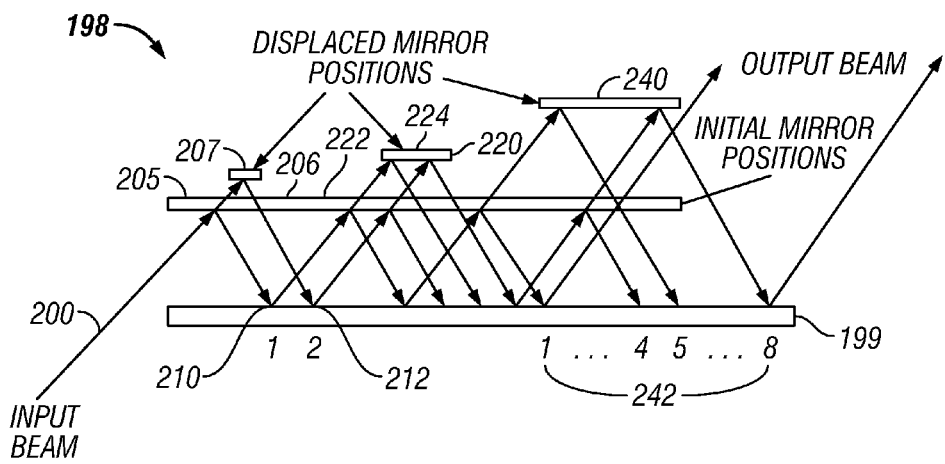
FIG. 2 shows an embodiment which uses a plane mirror and an array of movable mirrors.

An embodiment of a multiple-bit mirror system is shown in FIG. 2. This embodiment uses a first movable mirror array 198, and an unmovable plane mirror 199. Each beam is reflected by the plane mirror back to another movable mirror.

The input beam 200 is coupled to a first movable mirror 205. The mirror 205 can be displaced between first position 206 and second position 207. As in FIG. 1, the beam output shifts between one of two different positions, here 210, 212, based on the position of the first movable mirror 205. This produces a first pencil of beams 210, 212, having a width defined by the distance between the two beams 210, 212. The width correspondingly sets the minimum size of the second mirror 220.

Note that while the drawings shows two beams 210, 212, only one of those beams is actually produced at any one time. However, the distance between the beams 210, 212 defines the "pencil" which must be considered when sizing the second mirror 220. The beams are first reflected by movable mirror 205, then by plane mirror 199, back to the second movable mirror 220.

The second mirror 220 can be in either its first position 222 or its second position 224. The two possible input beams can be deflected from the two possible mirror positions as the different positions shown as pencil 230. The beams 230 have a second width which is twice as wide as the first beam pencil 210, 212. These beams are 110 deflected by the plane mirror 199 to the third mirror 240 which again can have two different positions, and again is twice as large as the mirror before. Positions 1-8, defining pencil 242, can be generated from the second mirror 240.

Position 1 in the first beam pencil 210 results from mirror 205 being in the relaxed or deenergized position which may correspond to a binary 0 having been applied to be electrostatic actuation unit associated with the mirror 205. Correspondingly, and conversely, position 207 of mirror 205 may be caused when the electrostatic attraction unit is energized, referred to as a binary "1". That means positions 206,207 of mirror 205 respectively correspond to binary "0" and "1".

Pencil 230 is formed of four beams sub labeled as 1,2,3 and 4. Note that the left most beam 1 occurs when the mirror 205 is in its de-energized position 206, and the mirror 220 is also in its de-energized position 222. Analogously, the beam position 2 is caused when the mirror 205 is in its energized position 207, and mirror 220 is in its deenergized position 222.

If we consider the mirror 205 to represent the most significant bit, then the digital sequence corresponding to position 2 is "10". Tracing all the rays in this way, the positions 1,2,3 and 4 in sequence respectively correspond to digital sequences 00, 10, 01, 11.

For pencil three, the output numbering corresponds to 000, 100, 010, 110, 001,101,011, and 111. Hence, the beam sequences are not produced in the binary counting order, which would be 000, 001, 010, 011, 100, 101, 110, 111.

The code sequence is a form of reflective binary code. This is not the usual form of reflective binary code, but rather one in winch the transformation allows interpreting a big endian number as a smaller endian number.

Note also that the code can be converted by simply reading the number backwards in binary, or by assigning the opposite sense to the bit significances. However, the output beams may not be in sequential order. That is, for example, the position corresponding to code word 10110 will not necessarily be next to the position corresponding to the code word 10111.

This system shows an operation with only three digital bits. However, any number of digital bits may be effected in this way. In the FIG. 2 embodiment, not only the mirror size, but also the amount of displacement of the mirror increases a binary progression. Other embodiments may modify the displacement requirement to make it more usable in a MEMS implementation, where it may be more desirable that all mirrors move by the same amount.

Each successive mirror of course must contain the entire output beam pencil width, which increases exponentially. Accordingly, the mirrors may be of different sizes to accommodate this changing pencil width. However, certain solutions to the deflection difference may be considered.

First, the incident angle of the input rays may be changed in order to change the width of the pencil. In an embodiment, the angle of attack of the rays is decreased instead of increasing the distance moved by the reflecting surface. This operation may have a relatively high angle of attack in the incident array e.g. close to 90 degrees. The apparatus is formed in multiple stages which deflect the rays.

Another embodiment may arrange the mirrors and reflectors into a logarithmic spiral.

The angle of attack $\theta$, for constant deflection distance, can be calculated as, $\Theta = \text{inverse } \tan(2d/a)$ hence, the mirror may be curved to this profile, e.g. to form an aspherical optical surface. This embodiment allows a constant mirror deflection distance to provide binary deflection.

Figure 3A:
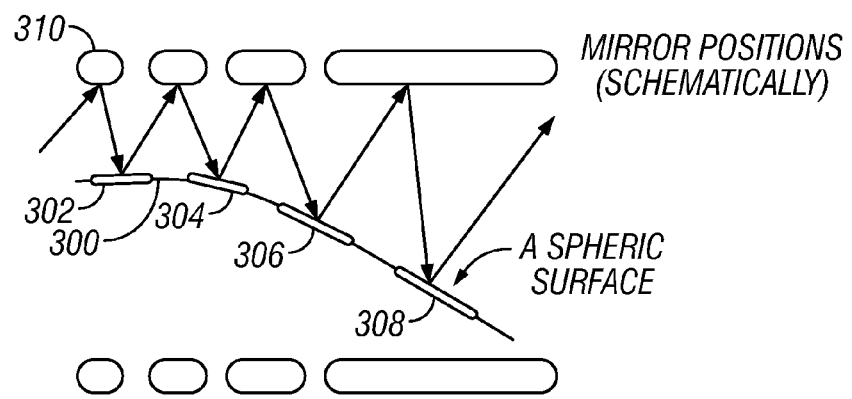
FIG. 3A and 3B show a system of allowing displacements of mirrors to be kept constant.

In another embodiment, the surface itself is not curved, but rather is formed of separated flat section. Curvature may in fact have certain disadvantages such as possibly imparting spherical aberration to the optical signal. Therefore, a preferred reflecting surface may be formed of a plurality of flat facets arranged to form a piecewise continuous curve. This embodiment is shown in FIG. 3A.

The mirror 300 is formed along an aspheric surface. However, each of the different mirror parts 300, 304, 306, 308 are actually flat.

Figure 3B:

Alternatively, the reflector may be stacked in a manner reminiscent of a Fresnel lens as shown in FIG. 3B. In this embodiment, the angle reflected by the "Fresnel" surface changes with each reflection to avoid the need for deflection modification of the moving mirrors.

Note a fresnel lens is a refractive or diffractive element . . . this surface is reflective hence the use of the word "reminiscent".

In the embodiment disclosed above, the fixed surface 300 is curved, and the deflection mirrors 310 extend along a substantially flat line. In an alternative embodiment, both the deflection surface and the reflection surface may extend along curved lines as shown in FIG. 4A.

In another embodiment, both top and bottom surfaces become deflection surfaces. FIG. 4B shows deformable mirrors placed on both surfaces.

Figure 4A:
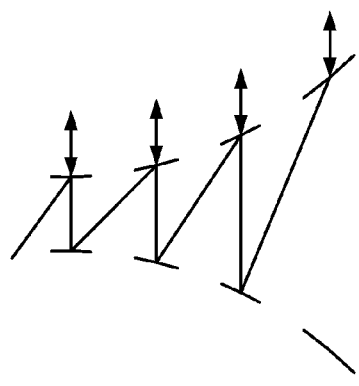
FIG. 4A-4B shows an embodiment which uses two sets of movable mirrors.
Figure 4B:
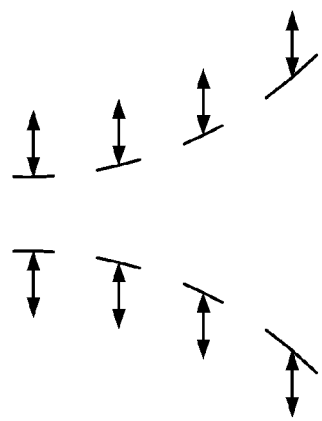

The alternative embodiment in FIGS. 4A and 4B. may require more moving parts, but may be more compact. Folded optics may be used to even further shorten the component length.

Figure 5A:
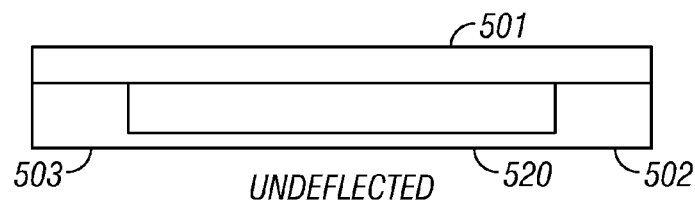
FIG. 5A-5D shows a deflectable mirror.
Figure 5B:
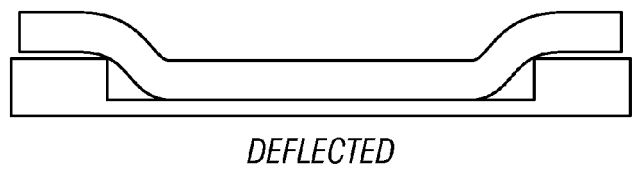

The movable mirrors of the present system are shown in FIGS. 5A and 5B. These movable mirrors are formed from a reflective MEMS diaphragm 501 that is stretched between two supports 502, 503. The MEMS diaphragm may be electrostatically moved. Each separate MEMS diaphragm forms a separate part of the segmented mirror. This mirror is electrostatically pulled down to the supporting frame in a manner that is analogous to that carried out in the display devices, e.g. those made by Silicon Light Machines. A device provides a constant pull down difference, providing a set of parallel reflecting surfaces. Each successive membrane portion may be twice as wide as the previous one as shown. A final width meets the conditions for the desired aperture.

The mirror may be formed from any of a number of different MEMS technologies, although it is believed that silicon nitride may be the best. Conventional techniques of forming doubly supported membrane strips may be used.

FIG. 5A shows the mirror in its undeflected or neutral position. The mirror may be moved from this neutral position to the deflected position shown in FIG. 5B. Electrostatic pull down force may pull the membrane down to be taut and flat, and to obtain the shape of the optically flat base plate 520.

Another embodiment forms changeable mirrors which operate based on total internal reflection. Two reflecting surfaces are used. These surfaces may be plane glass with incoming light that arrives at an angle that will be totally internally reflected.

Figure 5C:
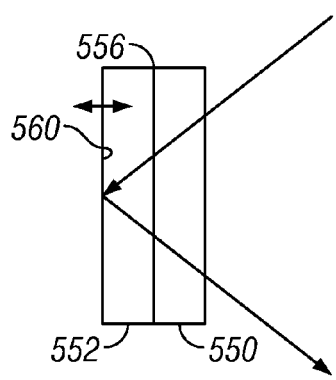

FIG. 5C shows the two surfaces pieces 550, 552 being in contact. The incident light passes through the interface 556 between the pieces 550,552 with minimal loss, reflects from the internal back surface 560 of the second mirror 552.

Figure 5D:
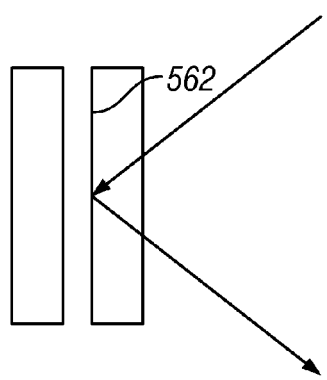

The first and second mirrors may be moved slightly relative to one another to separate the first piece 550 from the second piece 552. Once these surfaces are separated my more that a few microns, as shown in FIG. 5D, the reflection occurs at the first surface 562 of the first piece 550. Thus the second mirror need only be moved far enough to destroy the coupling—a motion of usually only a few microns. Here the required binary distance is provided by elements that increase in thickness in binary fashion. The distance to separate the mirrors stays the same.

Figure 6:
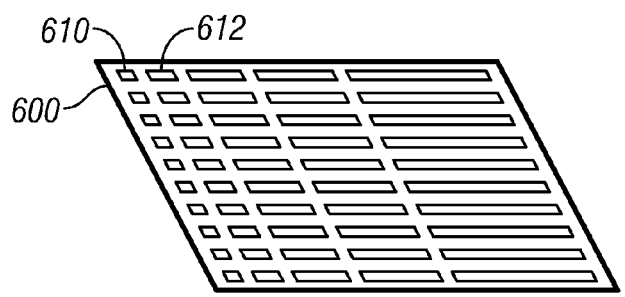
FIG. 6 shows a chip with an array of movable mirrors.

FIG. 6 shows an exemplary VLSI/MEMS chip which could be made using a plurality of parallel channels. Each channel such as 600 includes a plurality of progressively-increasing-in-size mirrors. The first mirror 610 is the smallest, with the second mirror 612 being double the size of the first mirror 610. Similarly, the third mirror is double the size of the second mirror, and the fourth mirror is double the size of be second mirror. The fifth mirror it is double the size of that. In this embodiment, only five mirrors are shown. However, many more, such as nine mirrors, may be placed on a single strip. For example, strip 1 cm long may be used.

The mirrors should be narrow in order to minimize the trapped air under the mirror. For example, the mirrors may be 10 to 20 microns wide for example but the exact width may be calculated by considering the movement of the trapped air as is done in conventional air damping calculations. This trapped air may provide pneumatic damping, and may also slow the frequency response. The multiple channels on a single chip allow the chip to have a square or rectangular outer shape.

The passive mirror may be flat or may be a faceted reflective mirror 300. If a faceted mirror is used, the mirror must have facets of the correct size, at the correct angle, and the correct position to reflect the incident beam, the outer extent of which doubles at each reflection. The passive mirror may reflect through the light from one mirror to the next. This mirror may be made using may be made using the EFAB process described in U.S. Pat. No. 6,027,630, and http://www.isi.edu/EFAB. This process ("EFAB") is a rapid prototyping process capable of making true three-dimensional shapes using nickel as a structural layer, and copper as a sacrificial layer. Hundreds of layers may be formed. Each layer may be diamond—milled for planarization between the layers. This surface can then act as the mirror.

EFAB may form the triangular wedges of FIG. 3B into parallel orientation with a thin film of metal connecting the wedges on a layer fabricated curved base. Subsequent copper etching can leave the membrane that then can be placed on a flat surface. The facets are therefore diamond milled, with the correct orientation. The EFAB process may match the inverse tangent curve. A mold and plate can be provided to plate the surface of the other molded parts. Alternatively, the surface may be made by matching with optical quality machine tools.

The above describes one-dimensional operation, however this system can be altered so be used to form a two-dimensional device.

Another embodiment may use a deflector that is better than linear in terms of spots per code word length. This system may form a system where there may be an overlap in the areas of output. A staircase of horizontal steps is formed, each with a fixed displacement between 0 and 1. The beam is reflected from a flat mirror. There is an overlap in the allowable output position. This overlap is determined, the resulting number of discrete addressable spots is less than 2n.

Yet another embodiment forms a two-dimensional deflector. The one-dimensional 1×n array provides to a certain number of output positions. The output of the one-dimensional deflector may be used as an input to a second deflector to deflect in the second direction and thus make a area scan in another direction. This scanning may be similar to a TV set or cathode ray tube display. Here the first scan essentially forms a line scan and the second stage takes this line and scans it in the orthogonal direction. (This compares with scanning techniques such as television where there is a horizontal scan and a vertical scan to make up a frame.) The same arrangement of mirrors is used to scan in the second direction; the mirrors have the same length but must have a width at least as wide as the final output pencil of the first deflector. The mirrors can all be made on one chip if the first beam is transposed before entering the second set of mirrors. Transposition between columns and rows is provided to give two-dimensional scanning in this way. Transposition may be produced by a simple prism with multiple internal reflections.

Many other embodiments are possible. First, there are many methods of moving the mirrors. These include magnetic and thermal actuators disclosed in the patent of Will, U.S. Pat. No. 6,075,924.

Although only a few embodiments have been disclosed in detail above, other modifications are possible. All such modifications are intended to be encompassed within the following claims.

The invention claimed is:

1. A method, comprising:
applying an input optical beam, of specified beam size to an array of reflector elements;
reflecting said input optical beam through said array to form an output optical beam at a location to form said output optical beam at said location without other optical beams that result from reflecting said input optical beam surrounding said location; and
controlling said reflector elements using multiple digital bits, such that each change of each single digital bit changes the location where said output optical beam is directed to at least one of multiple different spaced locations, the one of the spaced locations where the beam is directed being based on states of the multiple bits.

2. A method as in claim 1, wherein said array of reflector elements includes a plurality of moving mirrors, each of which deflects said input optical beam according to said digital bits.

3. A method as in claim 2, wherein at least some of said plurality of moving mirrors are each moved by a different amount than others of said moving mirrors.

4. A method as in claim 2, wherein said plurality of moving mirrors are each moved by the same amount.

5. A method as in claim 4, further comprising changing an angle of attack for each of a plurality of reflections.

6. A method as in claim 2 wherein each of said plurality of moving mirrors has a substantially different size.

7. A method as in claim 1, wherein said array of reflector elements includes an array of movable mirrors, and at least one unmovable mirror, positioned in a location to reflect light from one of said movable mirrors to another of said movable mirrors.

8. A method as in claim 7, wherein said unmovable mirror is substantially flat.

9. A method as in claim 7, wherein said unmovable mirror is substantially curved.

10. A method as in claim 7, wherein said unmovable mirror includes a plurality of separated parts, collectively defining a curved profile, but each of said separated parts being substantially flat.

11. A method as in claim 7, wherein said unmovable mirror includes a plurality of angled surfaces.

12. A method as in claim 7, wherein said angled surfaces are Fresnel surfaces.

13. A method as in claim 1, wherein said array of reflector elements includes a first sub array of movable mirrors extending along a first specified shaped surface, and a second sub array of movable mirrors extending along a second specified shaped surface.

14. A method as in claim 13, wherein said first and second shaped surfaces are substantially flat.

15. A method as in claim 13, wherein said first and second specified shaped surfaces are substantially curved.

16. A method as in claim 15, wherein each of said mirrors are substantially flat.

17. A method as in claim 13, wherein each of said reflector elements includes a reflective membrane which is moved between first and second positions.

18. A method as in claim 13, wherein each of said reflector elements includes first and second parts which are movable relative to one another.

19. A method as in claim 1, wherein said applying an input optical beam comprises applying a pencil-like beam from a laser device.

20. A method as in claim 1, wherein there are $2^n$ different possible locations, where n is a number of bits.

21. A method as in claim 20, where there is more than one bit.

22. An optical device comprising:
an arrangement of movable reflector elements which are separated from one another, and arranged such that for at least a plurality of said reflector elements, each of said plurality of reflector elements reflect
a light beam producing part, projecting a light beam to said reflector elements; and
a controller for said arrangement of reflector elements, said controller operating based on a plurality of digital bits which each change a position of one of said reflector elements to thereby change a location of an output beam produced from said light beam, to one of a plurality of different locations that is based on said digital bits.

23. A device as in claim 22, wherein each of said reflector elements comprises a movable, reflective membrane.

24. A device as in claim 22, wherein each of said reflector elements comprises first and second parts, which reflect light from a first location when touching one and reflect light from a second location when not touching one another, and an element for moving said first and second parts relative to one another.

25. A device as in claim 22, further comprising a plane mirror, which reflects between different ones of said reflector elements.

26. A device as in claim 25, wherein said plane mirror is substantially flat.

27. A device as in claim 26, wherein said plane mirror is formed of a plurality of different mirrored elements, each of which is substantially flat.

28. A device as in claim 25, wherein said plane mirror is formed along a curved area.

29. A device as in claim 22, wherein each of said reflector elements are movable by different amounts.

30. A device as in claim 22, wherein each of said reflector elements are movable by the same amount.

31. A device as in claim 22, wherein each of said plurality of moving elements has a substantially same size.

32. A device as in claim 22, wherein each of said plurality of moveable reflector elements has a substantially different size.

33. A device as in claim 22, further comprising a laser, producing an output beam, directed towards one of said reflector elements, and thereafter reflected to others of said reflector elements, to produce a pencillike output beam at said location.

34. An assembly comprising:
an optical device comprising an array of movable reflector elements; and
a controller for said array of reflector elements, said controller operating based on a plurality of digital bits which operate to change a position of said array of reflector elements to produce an output beam at a position based on said digital bits; wherein each of said plurality of reflector elements is movable and has a substantially different size and is arranged in a series; and
at least for a plurality of said reflector elements, each reflector element being twice as large as a reflector element directly prior to said each reflector element in said series.

35. A method, comprising:
applying an input optical beam of specified beam size to an array of reflector elements;
reflecting said input optical beam through said array to form an output optical beam at a location; and
controlling said reflector elements using multiple digital bits, such that each change of each single digital bit changes the location where said output optical beam is directed to at least one of multiple different spaced locations, the one of the spaced locations where the beam is directed being based on states of the multiple bits,
wherein there are $2^n$ different possible locations, where n is a number of bits, where there is more than one bit.

* * * * *